(12) United States Patent
Tokunaga et al.

(10) Patent No.: US 8,089,896 B2
(45) Date of Patent: Jan. 3, 2012

(54) NETWORK SYSTEM

(75) Inventors: Yoshihiko Tokunaga, Amagasaki (JP); Tomoyuki Hatanaka, Kitakatsuragi-gun (JP); Tomohiro Oda, Osaka (JP); Yoshiyuki Komoda, Suita (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 82 days.

(21) Appl. No.: 12/281,209

(22) PCT Filed: Mar. 28, 2007

(86) PCT No.: PCT/JP2007/056636
§ 371 (c)(1),
(2), (4) Date: Aug. 29, 2008

(87) PCT Pub. No.: WO2007/114162
PCT Pub. Date: Oct. 11, 2007

(65) Prior Publication Data
US 2009/0016235 A1    Jan. 15, 2009

(30) Foreign Application Priority Data
Mar. 28, 2006 (JP) ................ 2006-089599

(51) Int. Cl.
*G06F 11/00* (2006.01)
(52) U.S. Cl. ...................................... 370/252
(58) Field of Classification Search .............. 709/203, 709/217, 219, 224; 370/252
See application file for complete search history.

(56) References Cited

U.S. PATENT DOCUMENTS

| 6,332,157 | B1 | 12/2001 | Mighdoll et al. | |
|---|---|---|---|---|
| 7,339,895 | B2 | 3/2008 | Ozaki et al. | |
| 2003/0236824 | A1* | 12/2003 | Alsafadi et al. | 709/203 |
| 2006/0212531 | A1* | 9/2006 | Kikkawa et al. | 709/217 |

FOREIGN PATENT DOCUMENTS

| EP | 0 637 157 A2 | 2/1995 |
|---|---|---|
| EP | 1 061 708 A2 | 12/2000 |
| EP | 1 081 897 A1 | 3/2001 |
| JP | 09-218831 A | 8/1997 |
| JP | 10-074146 A | 3/1998 |
| JP | 2000-311129 A | 11/2000 |

(Continued)

OTHER PUBLICATIONS

International Search Report for the Application No. PCT/JP2007/056636 mailed Jun. 26, 2007.
Notice of payment of additional fee for the Application No. PCT/JP2007/056636 mailed Apr. 24, 2007.

(Continued)

*Primary Examiner* — Derrick Ferris
*Assistant Examiner* — Gbemileke Onamuti
(74) *Attorney, Agent, or Firm* — Cheng Law Group, PLLC (57) ABSTRACT

A network system is provided, in which a system change can be easily performed by adding or exchanging an equipment(s) to be controlled or monitored. The equipment has an object with an object identifier defined according to a service content provided by the equipment. Upon the receipt of a service request using the object identifier from a network device connected to the equipment via a network, the equipment executes the service defined in the object according to this service request. By assigning a same object identifier to objects of a plurality of equipments, it is possible to provide the same service from those equipments according to the service request performed from the network device by use of the same object identifier.

10 Claims, 5 Drawing Sheets

FOREIGN PATENT DOCUMENTS

| | | | |
|---|---|---|---|
| JP | 2000-517453 | A | 12/2000 |
| JP | 2002-501244 | A | 1/2002 |
| JP | 2002-528818 | A | 9/2002 |
| JP | 2003-060664 | A | 2/2003 |
| JP | 2005-149456 | A | 6/2005 |
| JP | 2006-268202 | A | 10/2006 |
| WO | WO-98/58313 | A1 | 12/1998 |
| WO | WO-99/35856 | A2 | 7/1999 |
| WO | WO-00/25221 | A2 | 5/2000 |

OTHER PUBLICATIONS

Notification of Reasons for Refusal for the Application No. 2006-089599 from Japan Patent Office mailed May 1, 2007.

Russian Official Action for Application No. 2008138577/09(049692) from Russian Federal Service on Intellectual Property, Patent and Trademarks dated Feb. 16, 2010.

Supplementary European Search Report for the Application No. EP 07 74 0074 dated Oct. 4, 2010.

* cited by examiner

NETWORK SYSTEM

TECHNICAL FIELD

The present invention relates to a network system for enabling a remote control or a remote monitoring of equipments connected to a network by a network device.

BACKGROUND ART

In the past, a system for controlling/monitoring equipments connected to a non-IP network by a terminal device connected to an IPv6 network has been proposed. This system has a gateway for enabling communication between the non-IP network equipments and the IPv6 network terminal device by acquiring identification information and interface ID of the non-IPv6 network equipments as well as network ID for the IPv6 network, generating IPv6 addresses from these IDs, and managing the correspondence between the generated addresses and the identification information. By way of this gateway, the equipments can be controlled or monitored by the terminal device.

For example, this kind of network system is disclosed in Japanese Patent Early Publication No. 2003-60664. In this system using the non-IPv6 equipments, an IPv6 network terminal device sends a packet with a header including destination IPv6 address, and the IPv6 address is allocated to the non-IPv6 equipment at a gateway. Therefore, when the terminal device accesses plural equipments, it becomes necessary to generate the IPv6 address corresponding to each of the equipments. That is, it is needed to take account of the IPv6 address. In addition, even when increasing the number of the equipments for performing the same operation, it becomes necessary to newly generate the IPv6 address corresponding to the added equipment. Therefore, there are inconveniences that the plural equipments cannot be controlled or monitored by use of a single identifier, and plural identifiers cannot be allocated to a single equipment. Furthermore, it is not possible to flexibly cope with an increase in the number of the equipments for providing services.

SUMMARY OF THE INVENTION

Therefore, in consideration of the above problems, a primary concern of the present invention is to provide a network system capable of easily increasing the number of equipments for providing services, and efficiently performing a remote control or a remote monitoring of the equipments according to the client's needs.

That is, the network system of the present invention comprises a plurality of equipments and a network device connected to the equipments via a network, and configured such that the equipment(s) executes an object according to a service request input from the network device, wherein an object identifier is assigned to the object, the network device has an identifier specifying portion configured to specify the object identifier, the equipments comprise plural equipments having objects, to which a same object identifier is assigned, and when the network device performs the service request by use of the same object identifier specified by the identifier specifying portion, the plural equipments provide same service, which is defined in the objects having the same object identifier.

According to the network system of the present invention, it is possible to allow the plural equipments to execute the same service in a lump sum by assigning the same object identifier to the objects of the plural equipments, without being necessary for a client (i.e., a user) to take account of specific identification information such as IP address of the equipment, which is used for network communication. In addition, it is possible to flexibly cope with an increase in the number of the equipments for providing services.

Another concern of the present invention is to provide a network system, which has the same basic configuration as the above network system, and comprises the following functions. That is, this network system comprises a plurality of equipments and a network device connected to the equipments via a network, and configured such that the equipment(s) executes an object according to a service request input from the network device, wherein an object identifier is assigned to the object;

the network device has an identifier specifying portion configured to specify the object identifier;

the equipments comprises an equipment having plural objects, to which different object identifiers are assigned, and when the network device performs the service request by use of one of the different object identifiers specified by the identifier specifying portion, the equipment provides a service defined in the object having the specified object identifier.

According to this network system, since a single equipment is allowed to have a plurality of objects, to which different object identifiers are assigned, a large variety of services can be provided by the single equipment.

When performing remote monitoring of the equipment(s) by the network system, it is preferred that each of the equipments comprises a function portion configured to execute processing for providing the service of the equipment, and an information processing portion configured to give and receive information defined in the object and needed to provide the service with the function portion. The information defined in the object comprises an operation instruction function for providing a service, which is sent from the information processing portion to the function portion when the object is accessed by the network device, a variable showing a current status of the function portion, which is sent to the network device when the object is accessed by the request of the network device, and event information, which is sent to the network device when a status change of the function portion occurs under a condition that the object is previously accessed by the network device.

In a preferred embodiment of the network system of the present invention, the object identifier comprises a unique identifier of the object of the equipment, and at least one interface identifier defined according to a function(s) of the equipment. When the network device performs the service request by use of the object identifier, a specific service corresponding to a combination of the unique identifier and the interface identifier can be executed.

In addition, as a further preferred embodiment of the network system of the present invention, the network device comprises a client terminal device and a server connected between the equipments and the client terminal device via the network, the server executes a server-side object according to a service request provided from the client terminal device, thereby performing a service request for executing an equipment-side object to the equipment(s), the client terminal device performs the service request by use of a first identifier assigned to the server-side object, and the server performs the service request by use of a second identifier assigned to the equipment-side object;

the second identifier includes at least one identifier defined according to a function(s) (e.g., "locking" and "air conditioning") of the equipment that executes the equipment-side object according to the service request for executing the server-side object provided from the client terminal device by use of the first identifier, and the server has an identifier setting portion configured to set a correspondence relation between the first identifier and the second identifier.

In this case, it becomes possible to provide a new service by the server-side object without changing the information definition of the equipment-side object or adding the equipment-side object. In addition, even when an additional equipment(s) is connected, it is possible to expand the kinds of services to be provided irrespective of the existing equipment(s). Moreover, since the execution request of the equipment-side object is sent through the server to obtain the service provided by the equipment, there is an advantage of reducing the burden on the client network device.

In the network system according to the preferred embodiment described above, it is further preferred that the second identifier comprises a unique identifier (OID) of the equipment-side object and at least one interface identifier (IID) defined according to a function(s) of the equipment (a service content(s) provided by the equipment), and the server has a routing function portion configured to prepare a routing table showing a relation between a combination of the unique identifier and the at least one interface identifier and connection address information for network communication (network connection related information) used to access the object having the object identifier, and execute routing processing.

In the network system according to the preferred embodiment described above, it is particularly preferred that the first object identifier comprises a unique identifier of the server-side object and at least one interface identifier defined according to a service content(s) provided to a client, the second object identifier comprises a unique identifier of the equipment-side object and at least one interface identifier defined according to a function(s) of the equipment, and the identifier setting portion is configured to set the correspondence relation between a combination of the unique identifier and the at least one interface identifier of the first identifier and a combination of the unique identifier and the at least one interface identifier of the second identifier.

In this case, it becomes possible to provide a specific service by a specific equipment. In addition, when the service request is performed by use of a same interface identifier, which is assigned to objects of the plural equipments, the same service corresponding to the definition content of the interface identifier can be provided in a lump sum by those equipments. Thus, it is possible to appropriately respond to the diversification of the information needed by the client, and cope with a system change such as an addition of the equipment(s) flexibly and easily.

It is also preferred that the server processes data, which is obtained by allowing the equipment(s) to execute the equipment-side object through the service request of the server-side object provided from the client terminal device, according to a content of the server-side object, and then sends the processed data to the client terminal device. In addition to the case of simply providing raw data obtained by allowing the equipment(s) to execute the equipment-side object to the client, it is possible to process the raw data into information needed by the client, and then provide the processed data to the client. Therefore, the client can receive a greater variety of services.

It is preferred that the server has functions of converting a prescribed communication protocol into SOAP and then sending the converted SOAP, and converting received SOAP into the prescribed communication protocol. In this case, it is possible to establish communication between the equipments and network device across a firewall provided for the network.

The networks system according to a preferred embodiment of the present invention can be defined as follows. That is, this network system comprises a plurality of equipments, at least one network device configured to send a request for a service(s) provided by the equipment(s) to the equipment(s) via a network. The equipment is formed with a function portion configured to execute processing for providing the service of the equipment, and an information processing portion configured to have at least one object defining information used to provide the service, to which an object identifier for accessing is assigned, and give and receive the information with the function portion according to the definition. The network device has a function of directly or indirectly sending a request with use of the object identifier to the equipment(s) via the network. When the objects possessed by the information processing portions of the respective equipments have the same definition content, a same object identifier is assigned to the objects. When the network device performs a service request by use of the same object identifier assigned to the objects of the equipments, each of the equipments executes the requested object corresponding to the object identifier to provide the same service defined in the object.

Furthermore, the networks system according to another preferred embodiment of the present invention can be defined as follows. That is, this network system comprises a plurality of equipments, at least one network device configured to execute a service request to the equipment(s) via a network. The equipment is formed with a function portion configured to execute processing for providing the service of the equipment, and an information processing portion configured to have at least one object defining information used to provide the service, to which an object identifier for accessing is assigned, and give and receive the information with the function portion according to the definition. The network device has a function of directly or indirectly sending the service request to the equipment(s) via the network by use of the object identifier. Different object identifiers are assigned to plural objects possessed by the information processing portion of one of the equipments. The network device has a function of specifying one of the object identifiers assigned to the objects in the one of the equipments. The one of the equipments executes the object corresponding to the specified object identifier to provide the service defined in the object.

According to the network system according to the preferred embodiment described above, it is possible to control or monitor of the equipments without being necessary for the user to take account of the specific identification information such as IP address used for network communication. In addition, when a same object identifier is assigned to the objects of the plural equipments, the same service can be provided by those equipments. Alternatively, when the different object identifiers are assigned to the objects in one of the equipments, a large variety of services can be provided by the single equipment.

In a preferred embodiment of the above network system, a unique identifier is assigned to each of the objects in the information processing portion of each equipment. Each of the objects has an input/output definition function of defining the information that is given and received between the function portion and the information processing portion, and an optional interface identifier is assigned to the input/output definition function. In a case where the network device sends the request to the equipment(s) by use of the object identifier to access the object of the information processing portion of the equipment(s), when the information needed to provide the service is the information defined by the input/output definition function with a same interface identifier under plural objects, the same service can be provided in one lump from plural equipments by use of the same interface identifier as the object identifier. In addition, when the information needed to provide the service is the information defined by a specific input/output definition function of a specific object, a specific service can be provided from a specific equipment by use of a combination of the unique identifier of the object and the interface identifier of the input/output definition function as the object identifier.

In a further preferred embodiment of the above network system, a server is provided on the network. This server detects the equipments connected to the network, and has a table for storing a correspondence relation between the object identifier of the object in the information processing portion of the detected equipment and network connection related information used to access the object with the object identifier. By executing routing processing for the service request provided from the network device to the equipment(s) via the network according to the table contents, an execution request of the object(s) of the equipment(s) corresponding to the service request is sent through the server. Therefore, it is possible to reduce the burden on the client network device.

As a further preferred embodiment of the above network system, the server comprises a processing portion having at least one server-side object. The processing portion defines information corresponding to the service provided by the equipment(s) and requested by the network device. An object identifier associated with the definition is assigned to the server-side object. When the object identifier of the server-side object is used in the service request provided from the network device, the server executes the server-side object, and sends an execution request of the object in the information processing portion of the equipment(s) associated with the server-side object to the corresponding equipment(s) by use of the object identifier of the object. In this case, it becomes possible to provide a new service according to the server-side object without changing the information definition in the equipment-side object, and adding the equipment-side object. In addition, even when the equipment(s) is added, it is possible to easily respond to the expansion of services to be provided independently of the existing equipments.

Further characteristics of the present invention and advantages brought thereby will be clearly understood from the best mode for carrying out the invention described below.

BEST MODE FOR CARRYING OUT THE INVENTION

The network system of the present invention is explained in detail below according to preferred embodiments.

First Embodiment

Figure 1A:
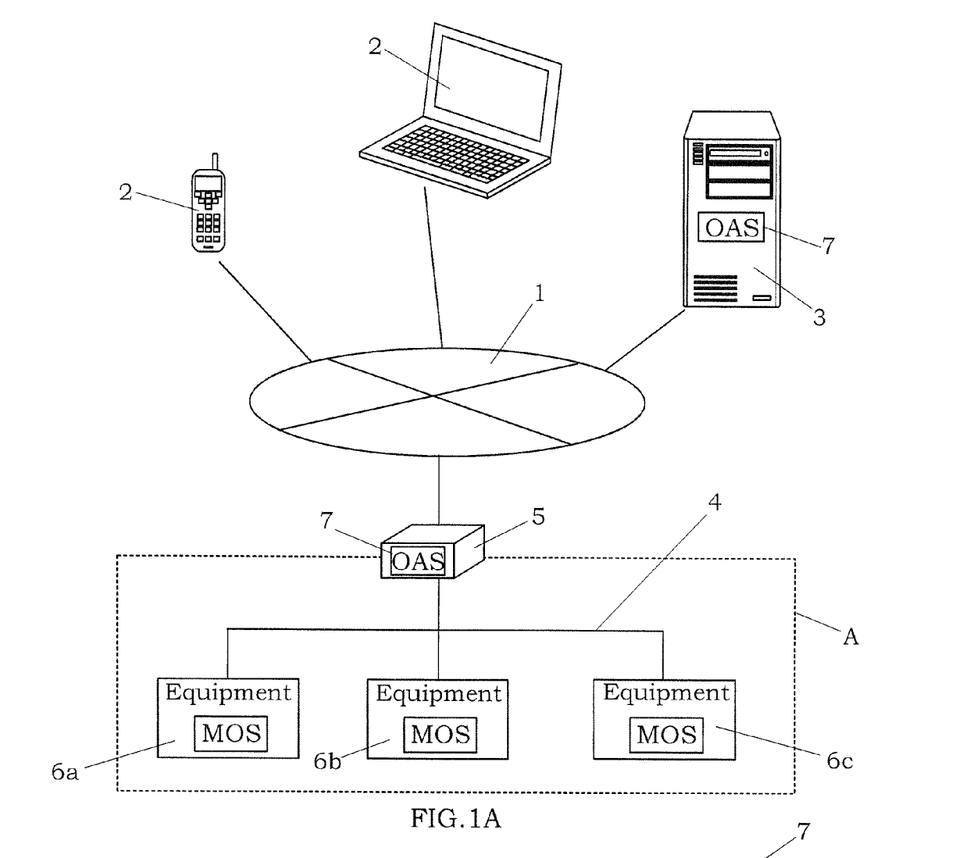
FIG. 1A is a schematic diagram of a network system according to a first embodiment of the present invention.

FIG. 1A is a schematic diagram showing a configuration of a network system of the present embodiment. This network system is mainly composed of a client terminal device 2, a center server 3, a gateway 5, and various kinds of equipments 6. The client terminal device 2 is a network device such as a personal computer connected to the Internet 1 that is an open network, or a mobile communication terminal device used in a mobile communication network connected to the Internet 1. The center server 3 is a network device having a function of an object access server 7 (hereinafter referred to as "OAS") connected to the Internet 1, as described later. The gateway 5 is connected between a local area network (LAN) 4 in a user area A and the Internet 1, and has the function of the above-mentioned OAS 7 including a protocol converting function between the Internet 1 and the LAN 4. The equipments 6 (three equipments 6a to 6c are shown in the attached drawing) connected by the LAN 4 are placed in a house or a building in the user area A.

Figure 2A:
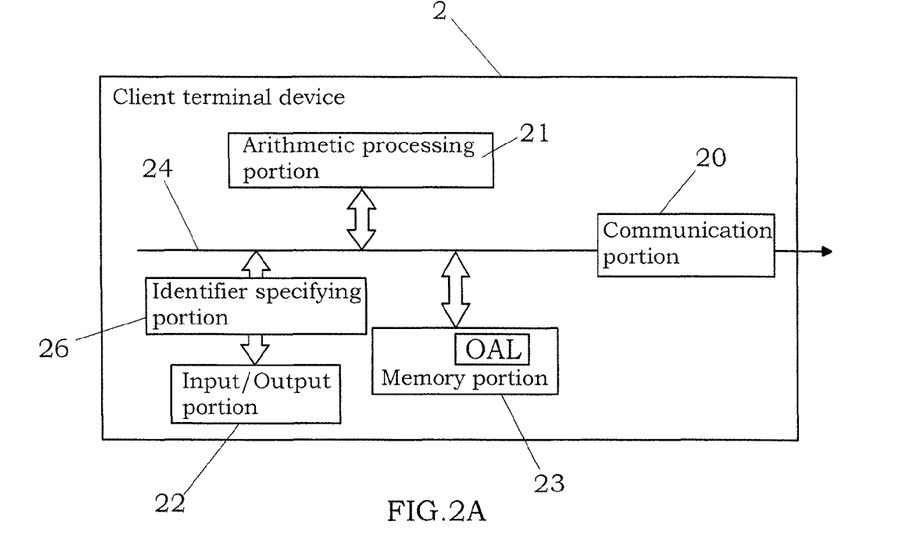
FIG. 2A is a configuration diagram of a client terminal device used in the network system.

As shown in FIG. 2A, the client terminal device 2 is provided with a communication portion 20 for network communication, an arithmetic processing portion 21, an input/output portion 22 such as a keyboard or a display, and a memory portion 23 used to temporarily store data, and install a client software (Object Access Library, hereinafter referred to as "OAL") for receiving services provided by the network system and a client application (software). In the arithmetic processing portion 21, node detection on the Internet 1 and the LAN 4 is performed by executing the OAL. In addition, the arithmetic processing portion 21 can access an object described later, and also execute the client application such that the service provided by the equipment 6 is received with a desired form by the client terminal device. Moreover, the client terminal device 2 has an identifier specifying portion 26 configured to individually specify an object identifier described latter. According to a service request input through the input/output portion 22, a prescribed object identifier is specified (selected). In FIG. 2A, the reference numeral 24 designates a bus.

Figure 2B:
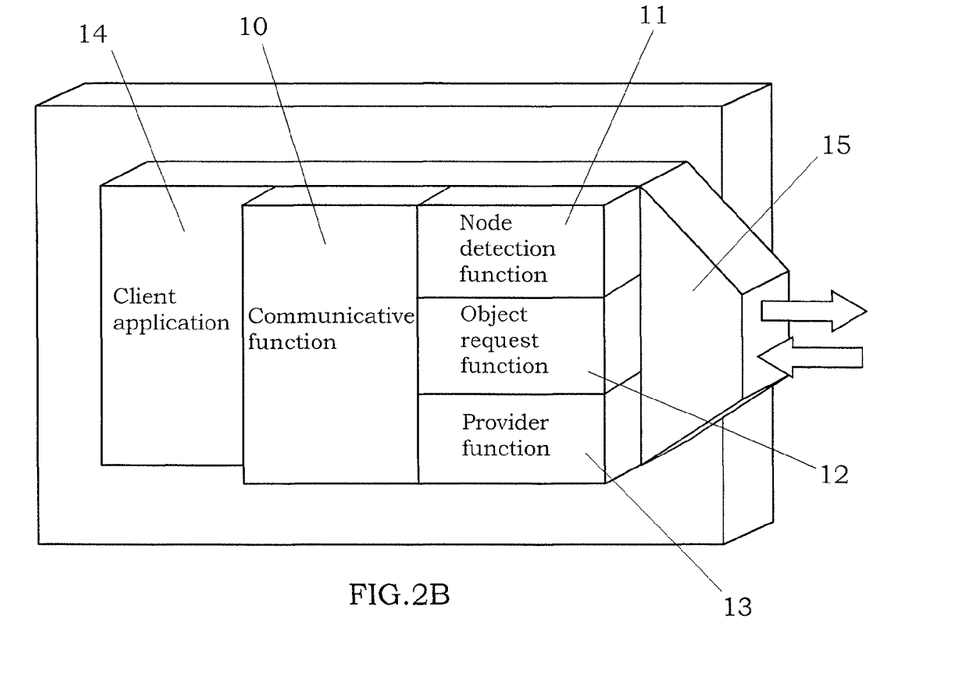
FIG. 2B is a configuration diagram of a client platform of the client terminal device.

In this embodiment, a client platform formed by the client application and the OAL has a configuration shown in FIG. 2B. The OAL has a communicative function 10 for giving and receiving information with the client application 14, a node detection function 11 for detecting the equipment with the object on the network, an object request function 12, a provider function 13 for network connection, transmission conditions 15 for OAL platform, and so on.

On the other hand, the equipments 6 (6a to 6c) connected to the network system can be located at a house or a building in the user area A. As the equipments located at the building, there are environmental equipments (lighting or air conditioning), crime-prevention equipment, disaster-prevention equipment, and sensor devices used in these equipments such as temperature sensor, brightness sensor, human detection sensor, and fire detection sensor. These are also available as the equipments located at the house.

Figure 3A:
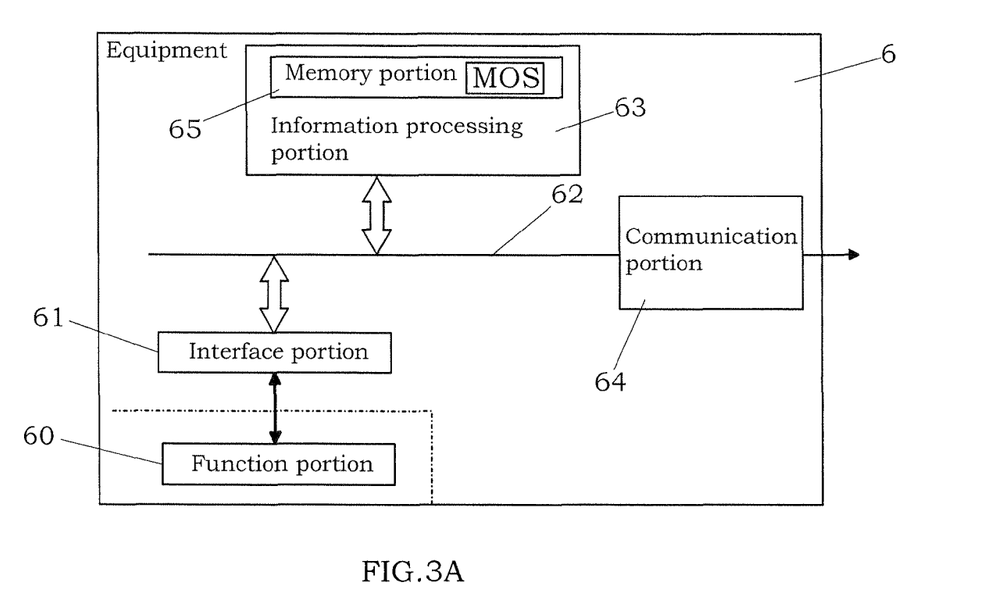
FIG. 3A is a configuration diagram of an equipment used in the network system.

As shown in FIG. 3A, each of these equipments 6 is basically composed of a function portion 60 for providing a service peculiar to the equipment 6, an information processing portion 63, and a communication portion 64 for network communication, and a memory portion 65 provided in the information processing portion 63. For example, when the equipment is an air conditioner, the function portion 60 corresponds to an air conditioning device and a control device for controlling the air conditioning. When the equipment is a lighting equipment, the function portion 60 corresponds to a lighting device for controlling lighting and brightness of lighting loads. When the equipment is a sensor device described above, the function portion 60 corresponds to a header for detection and a signal processing unit for outputting detection information detected by the header. The information processing portion 63 is configured to give an operation instruction (operation control) function to the function portion 60 through an interface portion 61 and a bus 62, acquire a variable showing a current status of the function portion 60, or acquire event information showing the occurrence of a status change of the function portion 60. In the memory portion 65, a software module (hereinafter referred to as "MOS" <Micro Object Server>) is installed to achieve the object server function in the network system of this embodiment.

Figure 3B:
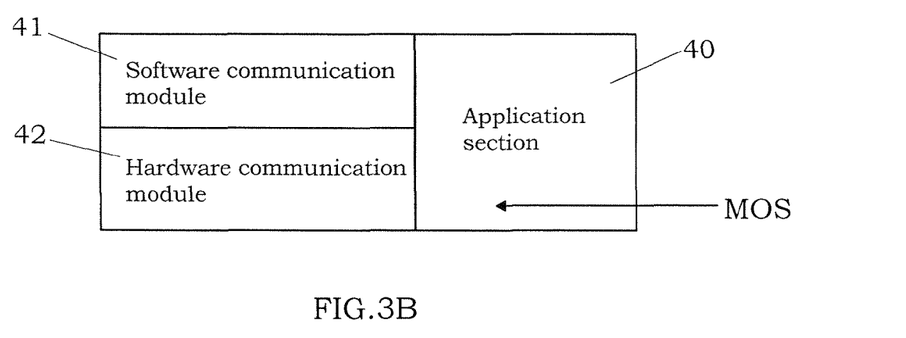
FIG. 3B is a configuration diagram of MOS of the equipment.

As shown in FIG. 3B, this MOS is composed of an application section 40 including an object that is a program module for providing the service, a software communication module 41 corresponding to OSI 7-layer protocol described later, and a hardware communication module 42 configured to communicate with the communication portion 64 and the interface portion 61.

In this embodiment, an OSI 7-layer model is used as the protocol for the network system. As an application layer of the uppermost layer, a unique object access protocol (OAP) is used to give and receive the information such as the variable, the function and the event information between the MOS of the information processing portion 63 of the equipment 6 and the client terminal device 2.

The software communication module 41 of the MOS is responsible for the protocol of from the network layer to the presentation layer of the OSI 7-layer model to perform the consolidation of TCPUDP and the definition of the above-mentioned OAP.

Each of the equipments 6 has at least one object, which is used when the function portion 60 executes processing for providing the service, in the MOS of the information processing portion 63. In addition, the object has at least one interface defined by the information such as the variable, the function and the event information corresponding to the service to be provided. A unique identifier (hereinafter referred to as "OID") is assigned to the object, and an interface identifier (or an input/output definition identifier, which is hereinafter referred to as "IID") is assigned to the interface. An interface having a same definition content, i.e., the interface having a same IID can be assigned to plurality of objects. In a service where it is not needed to specify a specific equipment 6, a same OID may be assigned to the objects of plural equipments 6.

In addition, as described above, the OAL of the client terminal device 2 can perform the service request by specifying IID/OID of the object of the equipment 6. In this case, the client terminal device 2 acquires the IP address of the equipment 6, OID of the object, and IID of the interface by use of the node detection function 11, and prepares a correspondence table between IID/OID and the IP address of the equipments.

Next, it is explained about a case where the client terminal device 2 accesses the object of the equipment 6 by use of OID of the object and IID of the interface in the system with the OAS 7 shown in FIG. 1A.

The above-described OAS 7 installed in the gateway 5 and the center server 3 is composed of a software for providing an object router function for hiding the network connection, various application softwares, which are executed to allow the user (the client terminal device 2) to receive the service provided by the function portion 60 of the equipment 6 by accessing the input/output definition function (i.e., the interface) under the object of the equipment 6, and softwares for providing additional service functions such as a protocol bridge service for a seamless connection to the network system of the present embodiment through a protocol conversion, and a firewall bridge service for converting the protocol in the OAS-7 layer model into SOAP to pass through the firewall.

In the case of accessing the interface of a specific object of the equipment 6, a service request of the client terminal device 2 is performed to the corresponding equipment 6 by the OAP through the center server 3. At this time, the IP address is used to identify the equipment 6 on the Internet communication. Therefore, each of the equipments 6 has the IP address.

The OAS 7 of the gateway 5 has a protocol conversion function, and a routing function. The routing function is provided by executing a software in a CPU portion (not shown) of the gateway 5. The routing function comprises preparing a routing table showing a correspondence relation between the IP address of each of the equipments 6 (6a, 6b, 6c) and combination information of IID of the interface and OID of the object in the MOS of each of the equipments 6 connected to the LAN 4, and executing routing processing. At the time of initial activation, the equipments 6 (6a, 6b, 6c) connected to the network are read out by means of multicasting with use of the OAP, and the node detection is performed according to the presence or absence of response to acquire the IP address. Subsequently, the above-described routing table (a connected equipment information table) is prepared at the gateway by use of the IP address and the combination information of OID of the object of the MOS and IID of the interface under the object provided from each of the equipments (6a, 6b, 6c). Then, the combination information and the IP address of the gateway are sent to a server on the Internet 1, i.e., the center server 3 in FIG. 1A.

Figure 1B:
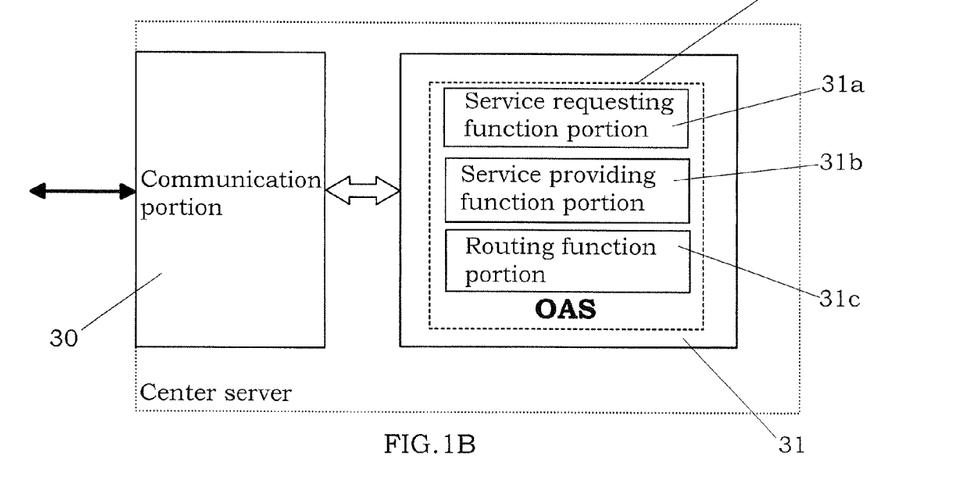
FIG. 1B is a configuration diagram of a central server used in the network system.

On the other hand, as shown in FIG. 1B, the center server 3 is formed by a computer system comprising a communication portion 30 for network communication and an arithmetic processing portion 31 for realizing the OAS 7 by executing a software. The OAS 7 of the center server 3 has a routing function portion 31c for preparing a routing table (a connected OAS information table) showing a correspondence relation between the IP address of the gateway 5 and the combination information of IID and OID of the equipments 6 provided from the gateway 5, and executing routing processing. In addition, the center server 3 provides the combination information of IID and OID of its own object to the client terminal device 2 connected through the Internet 1.

Next, an operation of the network system of the present embodiment is explained. In the user area A, the OAS 7 of the gateway 5 firstly accesses each of the equipments 6 (6a, 6b, 6c) connected to the LAN 4 in a multicasting manner when the system is started, and then acquires the IP address according to a response from each of the equipments 6 (6a, 6b, 6c).

Subsequently, the combination information of OID of the object of the MOS in the information processing portion 63 and IID of the interface under the object is sent from each of the equipments 6 (6a, 6b, 6c) to the gateway 5. The OAS 7 of the gateway 5 prepares a routing table having the combination information of the OID and the IID and the IP address of each of the equipments. In addition, the gateway 5 sends the combination information (of OID and IID) of each of the equipments 6 (6a, 6b, 6c) connected to the LAN 4 and the global IP address information of the gateway 5 to the OAS 7 on the Internet 1, i.e., the OAS 7 of the center server 3 shown in FIG. 1A.

In the OAS 7 of the center server 3, a routing table is prepared from the combination information of the IID of the interface and the OID of the object of the equipments 6 (6a, 6b, 6c) managed by the gateway 5 and the IP address of the gateway 5. In addition, the IID of the interface and the OID of the object of the equipments 6 (6a, 6b, 6c) stored in this routing table are sent from the center server 3 to the OAL of the client terminal device 2, and then saved therein. As a result, the client terminal device 2 can perform the execution request of the service to be provided by use of these OID and IID.

In the client terminal device 2, when an application for service request is launched to perform an operation of requesting the service provision to the equipments 6 by use of the object identifier (i.e., OID, IID), IID or OID of all of the object(s) with the interface defining the information corresponding to the requested service content, or the combination information of OID of the specific object and IID of the specific interface under the object is sent as the service request to the center server 3 via the Internet 1 by the OAP.

After the OAS 7 of the center server 3 receives, as the service request, the IID or the OID of the object(s) of the equipment(s) 6, or the combination information of IID and OID from the client terminal device 2, they are checked against the information stored in the routing table of the center server to extract the gateway 5, to which the equipments 6 (6a, 6b, 6c) corresponding to the IID, the OID or the combination information of IID and OID are connected through the LAN 4. Then, the center server 3 sends the service request with the IID, the OID, or the combination information of IID and OID provided from the client terminal device 2 to the extracted gateway 5.

After the OAS 7 of the gateway 5 receives the service request, it extracts the corresponding equipment(s) connected through the LAN 4 and managed by the gateway 5 according to the contents of the connected equipment information table, and sends the service request with the IID, the OID, or the combination information of IID and OID received from the center server 3 to the extracted equipment(s) 6.

That is, when performing the service request with use of only OID, the gateway 5 sends the service request with the OID to all of the equipment(s) 6 having the object, to which the OID is assigned. As a result, the information processing portion 63 of the equipment(s) 6 executes the object corresponding to the OID, so that information (function, variable, event information) defined by the interface(s) under the object is given and received between the information processing portion 63 and the function portion 60. When the same OID is assigned to the objects of plural equipments 6, the same service can be provided from those equipments 6.

In addition, when performing the service request with use of only IID, the OAS 7 of the gateway 5 sends the service request with the IID to all of the equipment(s) having the object with the interface, to which the IID is assigned. As a result, the information processing portion 63 of the equipment(s) 6 executes the object with the interface corresponding to the IID, so that the information (function, variable, event information) defined by the interface under the object is given and received between the information processing portion 63 and the function portion 60. When the same IID is assigned to the interfaces of the objects of the plural equipments 6, the service based on the information of the same definition content can be provided from the equipments 6.

Furthermore, when performing the service request with use of combination information of OID and IID, the OAS 7 of the gateway 5 sends the service request with the combination information of IID and OID to the equipment having the object, to which the OID are assigned, and the interface, to which the IID is assigned. As a result, the information processing portion 63 of the equipment 6 executes the object with the interface corresponding to the OID, so that the information defined by the interface under the object is given and received between the information processing portion 63 and the function portion 60. In this case, the service based on the information defined by the interface of the object of the specific equipment 6 can be provided from the equipment 6.

When the service request is performed to the interface defining the function, the information is not transferred from the equipment 6 to the client terminal device 2. When the service request is performed to the interface defining the variable, that is, the information of the current status of the equipment(s) is requested, the information is sent from the equipment 6 to the gateway 5, and the OAS 7 of the gateway sends the information to the center server 3, and finally the OAS 7 of the center sever 3 sends the information to the client terminal device 2.

In addition, with respect to the service request performed to the interface defining the event information, when the information processing portion 63 receives the event information showing that an event occurs at the function portion 60 of the equipment 6, the event information is sent from the equipment 6 to the gateway 5, and the OAS 7 of the gateway 5 sends the event information to the center server 3, and finally, the OAS 7 of the center server 3 sends the event information to the client terminal device 2.

Thus, according to the network system of the present embodiment, when the client terminal device 2 performs the service request by use of IID of the interface or OID of the object of the equipment(s) 6, it becomes possible to access the object(s) of the equipment(s) connected to the gateway 5 through the LAN 4 by help of the routing function of the OAS of the center server 3. Therefore, the client terminal device 2 can receive the service provided by the equipment(s) 6 without taking account of the IP address of the equipment(s) 6.

In addition, even when an additional equipment(s) 6 is newly connected to the network system to increase the number of services to be provided, IID and OID of the MOS of the additional equipment(s) 6 are sent to the client terminal device 2, as described above. Therefore, by simply changing or updating the application for performing the service request with respect to the IID of the interface and the OID of the object of the MOS of the additional equipment(s) 6, the client terminal device 2 can receive the service provided by the additional equipment(s) 6.

The center server 3 may have a web server function for constructing a web site, which is available for inspection with a browser installed in the client terminal device 2 other than the above-described OAS 7. In this case, there is an advantage that the information collected by the center server 3 becomes available for inspection anytime from the client terminal device 2.

Second Embodiment

The present embodiment is characterized by having the following functions in addition to the routing function described above. That is, on the OAS 7 of the center server 3, a definition content of the interface information under the object of the equipment 6 is redefined to obtain at least one object having at least one interface, to which an optional IID is assigned. When the client terminal device 2 accesses the sever-side object and the interface on this OAS 7 by use of OID and IID, the center server 3 accesses the equipment-side object and the interface of a previously associated equipment 6 by use of OID and the IID thereof. Therefore, a user can request the service provided by the equipment(s) 6 by accessing the IID of the interface under the object on the OAS 7 of the center server 3 from the client terminal device 2.

Next, it is explained about a case where the client terminal device 2 accesses an object of the OAS of the center server 3. To achieve the present embodiment, as shown in FIG. 1B, the center server needs to have a service requesting function portion 31a, and a service providing function portion 31b.

That is, the OAS of the center server 3 has the service requesting function portion 31a configured to perform, as the service request, a request of giving and receiving the information defined by the interface of the object to the equipment(s) 6 through the gateway 5 by use of OID that is the identifier of the object of the MOS in the information processing portion 63 of the equipment(s) 6, IID of the interface under the object, or combination information of the OID and the IID, and give and receive the information corresponding to the requested service with the equipment(s) 6 through the gateway 5. In addition, the service providing function portion 31b of the OAS of the center server 3 has an interface, which defines information used for a client receiving service, i.e., a service provided to the client. According to the definition of the interface, the information of the requested service is given and received between the service providing function portion 31b and the service requesting function portion 31a. In addition, the service providing function portion 31b has a sever-side object for executing a conversion between the information of the requested service and the information used for the client receiving service according to a definition. An OID is assigned to the sever-side object, and an optional IID is assigned to an interface under the object. Therefore, when the service providing function portion 31b receives, from the client terminal device 2, an execution request of the object with use of the unique identifier of the object, the IID of the interface under the object, or the combination of the OID and the IID, the service providing function portion 31b executes the corresponding object. The above-mentioned "conversion" means that certain information is converted into information with a different meaning, for example, "current temperature" is converted into "average temperature for a given length of time".

In the present embodiment, it becomes possible to provide a new service by the server-side object of the center server 3 without adding the equipment-side object or changing the information definition in the equipment-side object. In addition, even when the equipment(s) is added, it is possible to easily expand the kinds of services to be provided irrespective of the existing equipments 6.

Next, an operation of the network system of the present embodiment is explained according to a concrete example. In the following example, a correspondence relation between identifiers (OID, IID) assigned to each of the server-side objects and identifiers (OID, IID) assigned to each of the equipment-side objects is set in an identifier setting portion of the center server 3.

Figure 4A:
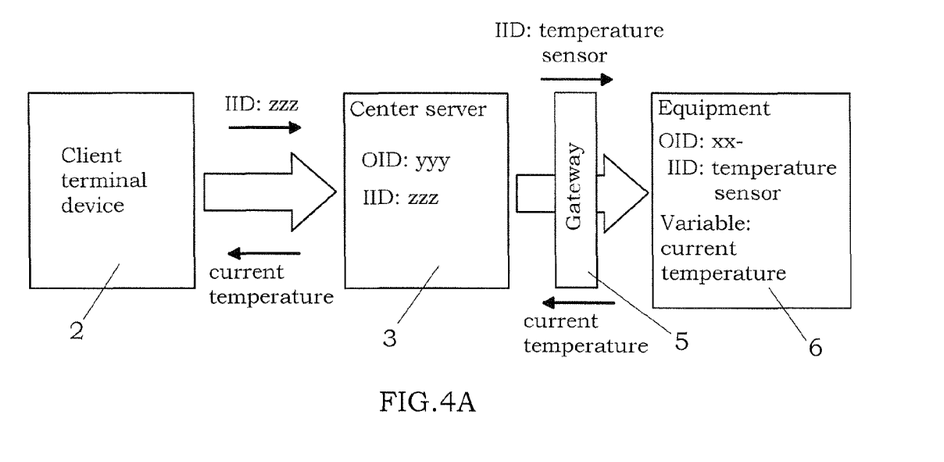
FIGS. 4A and 4B are operation explanatory views of a network system according to a second embodiment of the present invention.

Under conditions that the function portion 60 of the equipment 6 (6a, 6b, 6c) of FIG. 1A is a temperature sensor, as shown in FIG. 4A, and the information corresponding to the service provided by the temperature sensor is defined as a variable with the name of "current temperature", IID of the interface under the object (OID: xxa, xxb, xxc) of the information processing portion 63 of each of the equipments 6 (6a, 6b, 6c) is set as "temperature sensor" because the definition content is the same.

In the center server 3, the service requesting function portion 31a on the OAS 7 is realized by an application corresponding to a temperature monitoring service, which is programmed so as to periodically access the OID of the object having the interface, to which the IID "temperature sensor" is assigned, and record the variable of "current temperature" provided from the equipment 6 (6a, 6b, 6c) as a result of accessing. When IID "zzz" of the interface under the object with OID "yyy" associated with this application is accessed by the client terminal device 2, this application is launched to extract, by referring to the routing table, the gateway 5 connected via the LAN 4 to the equipment 6 (6a, 6b, 6c) having the object with the interface of the IID "temperature sensor" in the MOS, and then send, to the extracted gateway 5, the service request to the object with the interface, to which the IID "temperature sensor" is assigned.

On the other hand, the OAS 7 of the gateway 5 that has received the service request extracts the equipment 6 (6a, 6b, 6c), which has the object with the interface, to which the IID "temperature sensor" is assigned, and connected the gateway 5 via the LAN 4, by referring to the connected equipment information table, and then periodically performs the service request to the extracted equipment(s) 6.

The information processing portion 63 of the equipment 6 that has received the service request acquires current temperature information detected by the function portion 60 that is the temperature sensor, and sends it as the variable "current temperature" to the gateway 5. The variable "current temperature" received by the OAS 7 of the gateway 5 is then sent to the center server 3. By the application for realizing the service providing function portion 31b on the OAS 7 of the center server 3, the variable "current temperature" is sent to the client terminal device 2, which performed the service request. Therefore, the user can arbitrarily obtain information of the current temperature and the temperature transition in a house or a building from a remote location by use of the client terminal device 2.

For example, when each of the equipments (6b, 6c) has the object with the interface, to which the same IID as the interface under the object of the equipment 6a is assigned, the variable "current temperature" can be provided as the service from the equipments (6b, 6c) in addition to the equipment 6a.

In addition, in a case where the equipments 6a, 6b are previously located, and the equipment 6c is additionally located, the equipment 6c has a different IP address from the equipments 6a, 6b. On the other hand, OID of the object of the equipment 6c and IID of the interface under the object are stored in the routing table (the connected OAS information table) of the OAS 7 of the gateway 5. Furthermore, the IID, the OID and the IP address of the gateway 5 connected to the corresponding equipment 6c via the LAN 4 are added to the routing table of the OAS 7 of the center server 3. However, since the application on the OAS 7 of the center server 3 can send the service request for accessing the interface, to which the IID "temperature sensor" is assigned, under the object of the equipment 6c through the gateway 5 according to the service request from the client terminal device 2 without directly taking account of the IP address of the added equipment 6c, it becomes possible to cope with system change simply and flexibly.

Figure 4B:
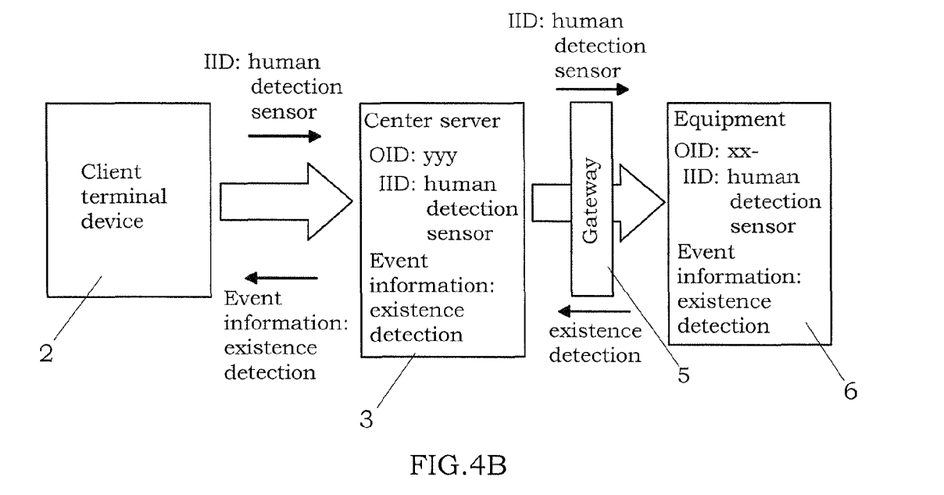

Next, another operation of the network system of the present embodiment is introduced according to the following example. In the above case, with respect each of the equipments 6 (6a, 6b, 6c), the function portion 60 is provided by the temperature sensor, and the information processing portion 63 has the interface, to which the IID "temperature sensor" is assigned, under the object. In the present example, as shown in FIG. 4B, with respect each of the equipments 6 (6a, 6b, 6c), the function portion 60 is provided by a human detection sensor, and the information processing portion 63 has the interface, to which the IID "human detection sensor" is assigned, under the object. Therefore, the present example provides a service of notifying event information showing that the human detection sensor has detected a human being.

Therefore, in this case, the information defined in the interface under the object is the event information with the name of "existence detection", and "human detection sensor" is assigned as the IID.

The MOS of the equipment 6 (6a, 6b, 6c) executes processing for receiving the event information from the function portion 60. When the event information is sent from each of the equipments 6 through the gateway 5, a crime-prevention service application as the application of the OAS 7 on the center server 3 sends the event information to the client terminal device 2 such as a mobile-phone. Therefore, the OID of the object associated with this application and the IID "human detection sensor" of the interface under the object are accessed from the client terminal device 2, the application is launched to execute processing for acquiring a mail address of the mobile-phone used as the client terminal device 2, and extracting the gateway 5 connected via the LAN 4 to the equipment 6 (6a, 6b, 6c) having the object with the interface, to which the IID "human detection sensor" is assigned, in the information processing portion 63 by use of the above-mentioned routing table (i.e., the connected OAS information table). As a result, the service request to the object with the interface, to which the IID "human detection sensor" is assigned, is sent to the extracted gateway 5.

In response to this service request, the OAS 7 of the gateway 5 extracts a corresponding equipment(s) 6 (6a, 6b, 6c) connected to the LAN 4 by use of the connected equipment information table, and sends the service request to the extracted equipment(s) 6. In the information processing portion 63 of the extracted equipment(s) 6, a corresponding object is executed. When the function portion 60 detects the existence of the human being, the event information showing the status change, i.e., "existence detection" is sent to the OAS 7 of the gateway 5. The even information received by the gateway 5 is further sent to the center server 3.

When the event information of "existence detection" is sent from anyone of the equipments 6 (6a, 6b, 6c) through the gateway 5, the OAS 7 of the center server 3 notifies the event information of "existence detection" to the client terminal device 2. For example, when each of the equipments (6b, 6c) has the object with the interface, to which the same IID as the interface under the object of the equipment 6a is assigned, it is possible to receive, as the service, the event information of "existence detection" from the equipments (6b, 6c) as well as the equipment 6a.

As in the case of the above example, according to this example, the event information can be notified to the client terminal device 2 in response to the occurrence of the event at the added equipment 6c without changing the application on the OAS 7 of the center server 3. Therefore, it becomes possible to cope with system change simply and flexibly.

Next, still another operation of the network system of the present embodiment is introduced according to the following example. In the above-described example, the information processing portion 63 of each of the equipments 6 (6a, 6b, 6c) has one object with one interface, to which the same IID is assigned. In the present example, one object has a plurality of interfaces, and IIDs corresponding to service contents to be provided are assigned to the interfaces. In addition, a same IID is assigned to the interfaces having the same definition content among the equipments 6 (6a, 6b, 6c). Therefore, the user can receive diversified services from the function portion 60.

For example, when the function portion 60 of each of the equipments 6 (6a, 6b, 6c) is provided by a human detection sensor, which has the function of providing the detection information of a human being, it is possible to provide the event information showing the occurrence of the event, as described above, or information (function) according to the user's request. Therefore, the diversification of services can be achieved by assigning an appropriate IID to the interface according to service contents and a combination of information definitions.

Figure 5:
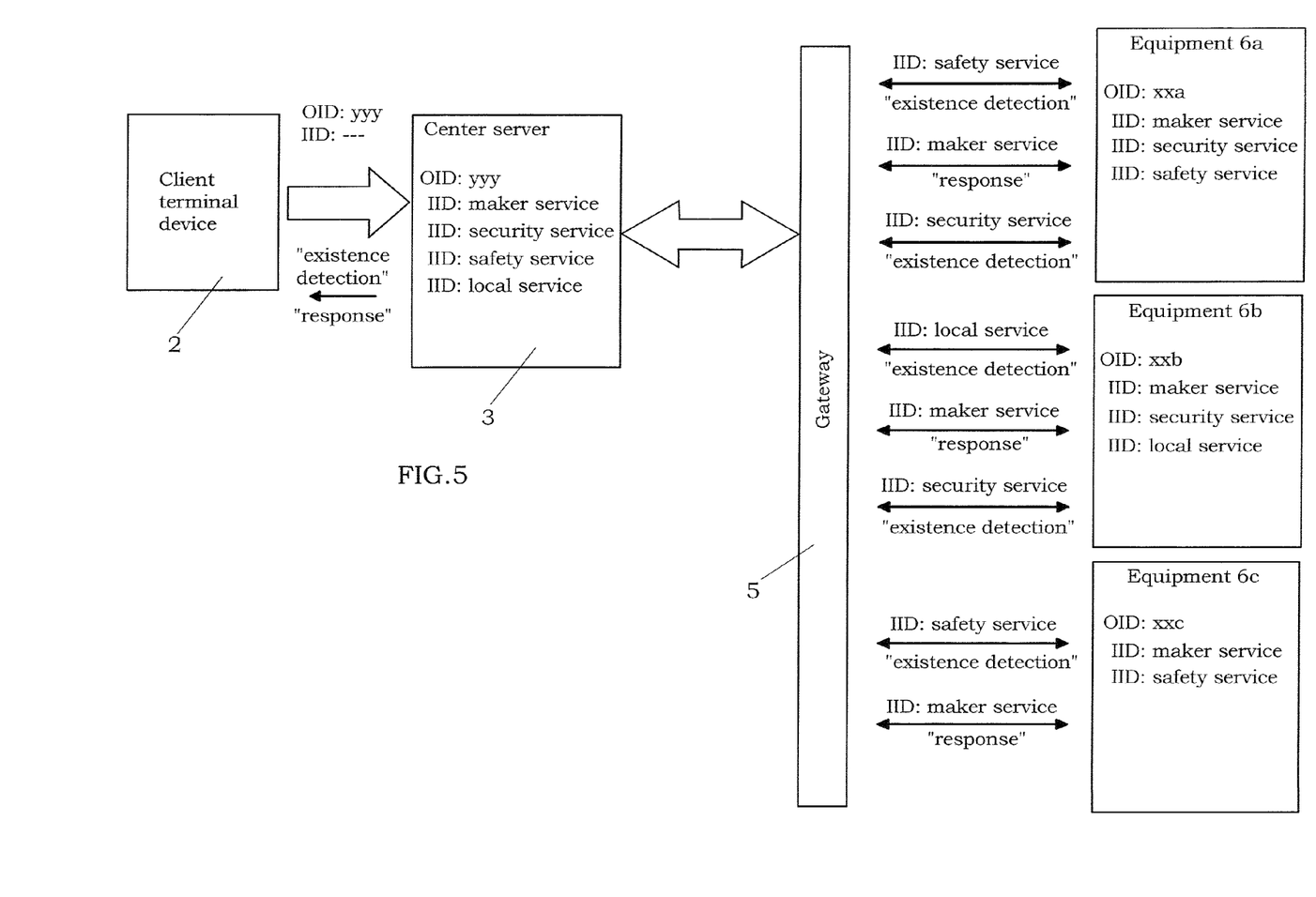
FIG. 5 is another operation explanatory view of the network system of the second embodiment.

That is, as shown in FIG. 5, a plurality of interfaces with IIDs such as "safety service", "security service", "local service" and "maker service" are prepared. In this explanation, the IID "maker service" is assigned to the interface under the object of the MOS in all of the equipments 6 (6a, 6b, 6c), and a function of "response" is defined in the interface. In addition, the IID "safety service" is assigned to the interface under the object of the MOS in each of the equipments (6a, 6c) located at indoor area, and the event information of "existence detection" is defined in the interface. Moreover, the IID "security service" is assigned to the interface under the object of the MOS in the equipment 6a located at a house entrance, and the IIDs "local service" and "security service" are assigned to the interfaces under the object of the MOS in the equipment 6b located at the periphery of the house, and the event information of "existence detection" is defined in the interfaces. Thus, different kinds of services are set with respect to each of the equipments 6 (6a, 6b, 6c).

On the other hand, as an application for providing the service corresponding to the interface with IID, when the OAS 7 of the center server 3 receives, from the client terminal device 2, a service request of accessing the IID (e.g., "safety service" of the equipments 6a, 6c, "security service" of the equipments 6a, 6b or "local service" of the equipment 6b) of the interface defining the event information of "existence detection" under the OID "yyy" of the object, the center server 3 sends a service request of accessing the interface with the IID "safety service", "security service" or "local service" to the corresponding equipment(s) (6a, 6b, 6c) via the gateway 5. Subsequently, when a change in information detected by the human detection sensor occurs, the event information of "existence detection" indicative of the presence or the absence of the human being is sent to the gateway 5. This event information is then sent to the corresponding client terminal device 2.

For example, in the case of "safety service", a behavior of a single elderly person can be detected by the human detection sensors of the indoor-located equipments 6a, 6c. When the existence of the human being is detected frequently, a user such as members of the family of the elderly person can obtain the information about the condition of the elderly person through the client terminal device 2.

In the case of "security service", a human being detection can be performed by use of the human detection sensor of the equipment 6b located at the vicinity of, for example, a house and the human detection sensor of the equipment 6a located at the house entrance. During the user's absence, when the equipment 6b sends the event information of "existence detection" to the client terminal device 2, and after a while the equipment 6a sends the event information of "existence detection" to the client terminal device 2, the user can obtain the information about the existence of an illegal intruder according to the time elapse of the event information of "existence detection".

Furthermore, in the case of "local service", when a human being is detected by use of the human detection sensor of the equipment 6b located in the vicinity of a house, the event information of "existence detection" is sent from this equipment 6b to the client terminal device 2. Therefore, it is useful as a service for crime prevention in the vicinity of the house (local area).

As an application for providing the service corresponding to the interface with the IID "maker service", when a maker-side terminal device 2 accesses the IID "maker service" of the interface under the object with the OID "yyy", the center server sends a service request for accessing the interface with the IID "maker service" of the equipments (6a to 6c) through the gateway 5. In this case, the detection information of the human detection sensor is sent as a function of "response" from the equipments through the gateway 5, and the function content is sent to the maker-side terminal device 2. Therefore, the maker can obtain the information about the operation state of the maker's product, and effectively use the information for maintenance or the like.

Thus, in the present example, the plural interfaces are prepared under one object in the information processing portion 63 of one equipment 6. In addition, plural information can be defined in each of the interfaces, and different IID can be assigned to each of the interfaces. Therefore, it is possible to diversify the method of receiving the services from the equipments 6 such as receiving the service from a desired equipment.

In the present example, the service request is sent from the client terminal device 2 to the object of the center sever 3. Alternatively, as in the case of the first embodiment, the client terminal device 2 may directly send the service request to the equipment(s) 6 by use of OID and/or IID corresponding to the service in the MOS of the information processing portion 63 to receive the equivalent service.

Furthermore, another operation of the network system of the present embodiment is introduced according to the following example. In the above case, the plural interfaces with different IIDs are defined under one object. In the present example, the function portion 60 of each of the equipments 6 (6a, 6b, 6c) shown in FIG. 1A is provided by an electrical locking device, and a combination of plural information definitions is set in one interface such that the information defined by the interface under the object in the information processing portion 63 has a function of "locking", a function of "unlocking", and a variable of "current status" in response to the operation of the electrical locking device. In addition, "electrical locking device" is used as IID.

For example, as an application on the OAS 7 of the center server 3, a software can be programmed to send a service request of accessing the interface with the IID "electrical locking device" under the object in the information processing portion 63 of each of the equipments 6 (6a, 6b, 6c) through the gateway 5 according to a predetermined time schedule, so that the function of "locking" or "unlocking" is given to the function portion 60. In this case, it is possible to automatically provide a service for locking or unlocking the electrical locking device (i.e., the function portion 60). In addition, when the center server 3 receives the variable of "current status" from the equipments 6 (6a, 6b, 6c), it is possible to notify the information of the current status to the client terminal device 2, or display the information on a web site.

In this example, for example, when the equipments 6a, 6b are previously located in a facility, and subsequently the equipment 6c is newly located in the facility, the equipment 6c needs to have another IP address. At this time, by defining the same information in the interface under the object in the information processing portion 63 of the equipment 6c, and using "electrical locking device" as the IID, it becomes possible to control the electrical locking device (i.e., the function portion 60) of the added equipment 6c according to the predetermined time schedule without changing the application on the OAS 7 of the center server 3. In place of sending the service request from the client terminal device 2 to the object of the center sever 3, the client terminal device 2 may directly send the service request to the equipment(s) by use of OID and/or IID corresponding to the service in the MOS of the information processing portion 63, thereby obtaining the equivalent service.

In each of the above embodiments, an electrical apparatus for household use such as audio-video equipment may be used as the equipment 6. In addition, when the MOS is mounted in a controller for an integrated control system, the controller can be used as the equipment 6 in the present network system.

INDUSTRIAL APPLICABILITY

As described above, according to the network system of the present invention, it is possible to individually monitor equipments for providing services or control the equipments in a lump sum, without being necessary for the user to take account of specific identification information such as IP address of the equipments, which is used for the network communication. In addition, even when an additional equipment(s) is connected to the network system, it is possible to flexibly respond to the needs of the individual user. Thus, since the present invention can provide comfortable safe living and working spaces by controlling/monitoring the equipment(s) located far away by use of a portable network device or the like, it is expected to be widely utilized as the next generation network system.

The invention claimed is:

1. A network system comprising a plurality of equipments and a client terminal device connected to said plurality of equipments via a network, and configured such that said plurality of equipments executes an object according to a service request input from said client terminal device, each of said plurality of equipments has at least one object, to which an object identifier is assigned;

said client terminal device has an identifier specifying portion configured to specify said object identifier, and a function of sending the service request with said object identifier via the network, when said plurality of equipments comprise a specific equipment having plural objects, to which different object identifiers are assigned, and said client terminal device performs the service request by use of one of the different object identifiers specified by said identifier specifying portion, the specific equipment provides a service defined in said object having the specified object identifier, when said plurality of equipments comprise plural specific equipments having objects, to which a same object identifier is assigned, and when said client terminal device performs the service request by use of the same object identifier specified by said identifier specifying portion, the plural specific equipments provide same service, which is defined in said objects having the same object identifier, said object identifier comprises a unique identifier of said object of an equipment, and at least one interface identifier defined according to a function(s) of an equipment, when said client terminal device performs the service request by use of a same interface identifier assigned to plural objects of said plurality of equipments, said plurality of equipments provide same service corresponding to a definition content of the same interface identifier, when said client terminal device performs the service request by use of a combination of said unique identifier and said interface identifier, a specific one of said plurality of equipments provides a service corresponding to the definition content of said interface identifier, the network system further comprises a first object access server and a second object access server connected between said plurality of equipments and said client terminal device via the network, said first object access server is configured to detect said equipment connected to said first object access server, and prepare a first routing table showing a correspondence relation between combination information of said unique identifier and said interface identifier of said detected equipment and first connection address information for network communication for accessing said object, and send the combination information and second connection address information for network communication for accessing said first object access server to said second object access server, said second object access server is configured to receive the combination information and the second connection address information from said first object access server, and prepare a second routing table showing a correspondence relation between the combination information and the second connection address information, and send the combination information to said client terminal device, said second object access server is configured to, upon receiving the service request from said client terminal device via said network, refer to said second routing table, and select said first object access server associated with the combination information corresponding to said object identifier used for said service request, and send the service request to the selected first object access server, said first object access server is configured to, upon receiving the service request from said second object access server, refer to said first routing table, and select said equipment which corresponds to the combination information corresponding to said object identifier used for said service request, and send the service request to the selected equipment.

2. The network system as set forth in claim 1, wherein each of said equipments comprises a function portion configured to execute processing for providing the service of said equipment, and an information processing portion configured to give and receive information defined in said object and needed to provide the service with said function portion.

3. The network system as set forth in claim 2, wherein the information defined in said object is a variable showing a current status of said function portion, which is provided to said client terminal device when said object is accessed by the request of said client terminal device.

4. The network system as set forth in claim 2, wherein the information defined in said object is event information, which is provided to said client terminal device when a status change of said function portion occurs under a condition that said object is previously accessed by said client terminal device.

5. The network system as set forth in claim 2, wherein the information defined in said object is an operation instruction function for providing a service, which is sent from said information processing portion to the said function portion when said object is accessed by said client terminal device.

6. The network system as set forth in claim 1, wherein said server executes a server-side object according to a service request provided from said client terminal device, thereby performing a service request for executing an equipment-side object to said equipment(s), said client terminal device performs the service request by use of a first identifier assigned to said server-side object, and said server performs the service request by use of a second identifier assigned to said equipment-side object, said second identifier includes at least one identifier defined according to a function(s) of said equipment that executes said equipment-side object according to the service request for executing said server-side object provided from said client terminal device by use of said first identifier, and said server has an identifier setting portion configured to set a correspondence relation between said first identifier and said second identifier.

7. The network system as set forth in claim 6, wherein said first object identifier comprises a unique identifier of said server-side object and at least one interface identifier defined according to a service content(s) provided to a client, said second object identifier comprises a unique identifier of said equipment-side object and at least one interface identifier defined according to a function(s) of said equipment, and said identifier setting portion is configured to set the correspondence relation between a combination of said unique identifier and said at least one interface identifier of said first identifier and a combination of said unique identifier and said at least one interface identifier of said second identifier.

8. The network system as set forth in claim 6, wherein said server processes data, which is obtained by allowing said equipment(s) to execute said equipment-side object through the service request of said server-side object provided from said client terminal device, according to a content of said server-side object, and then sends the processed data to said client terminal device.

9. The network system as set forth in claim 6, wherein said server has functions of converting a prescribed communication protocol into SOAP and then sending the converted SOAP, and converting received SOAP into the prescribed communication protocol.

10. The network system as set forth in claim 1, wherein said plurality of equipments comprise an equipment located at a house or a building.

* * * * *